(12) United States Patent
Kamotani

(10) Patent No.: US 8,644,685 B2
(45) Date of Patent: Feb. 4, 2014

(54) IMAGE EDITING DEVICE, IMAGE EDITING METHOD, AND PROGRAM

(75) Inventor: Yusuke Kamotani, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/396,046

(22) Filed: Feb. 14, 2012

(65) Prior Publication Data

US 2012/0213487 A1 Aug. 23, 2012

(30) Foreign Application Priority Data

Feb. 17, 2011 (JP) ................................. 2011-031593

(51) Int. Cl.
*H04N 5/761* (2006.01)
(52) U.S. Cl.
USPC .......................................... 386/278; 386/282
(58) Field of Classification Search
None
See application file for complete search history.

(56) References Cited

U.S. PATENT DOCUMENTS

| 2001/0037722 | A1 | 11/2001 | Shimizu et al. |
| 2005/0088442 | A1* | 4/2005 | Ota ................................. 345/473 |
| 2006/0079977 | A1* | 4/2006 | Nagai et al. ..................... 700/94 |
| 2006/0114327 | A1 | 6/2006 | Araya et al. |
| 2010/0281375 | A1* | 11/2010 | Pendergast et al. ........... 715/723 |
| 2011/0164147 | A1* | 7/2011 | Takahashi et al. ........ 348/231.99 |

FOREIGN PATENT DOCUMENTS

| JP | 2006-157197 A | 6/2006 |
| JP | 2007-096678 A | 4/2007 |
| JP | 2009-118295 A | 5/2009 |

* cited by examiner

*Primary Examiner* — Huy T Nguyen
*Assistant Examiner* — Eileen Adams
(74) *Attorney, Agent, or Firm* — Renner, Otto, Boisselle & Sklar, LLP

(57) ABSTRACT

An image editing device includes: a display controller that outputs a video signal to a display device; an input interface that receives from a user settings information about a plurality of candidate images, about a total play time of a sequence of images to be created, and about displaying effects of the respective images used in the sequence of images; and an image sequence creating unit that creates the sequence of images using a plurality of images that are selected from the plurality of candidate images. When the total play time and the displaying effects are set, or when at least one of the total play time and the displaying effects is changed, a total count of images planned to be used in the sequence of images, or an estimated value of the total count, is determined and displayed on the display device.

17 Claims, 10 Drawing Sheets

FIG.3

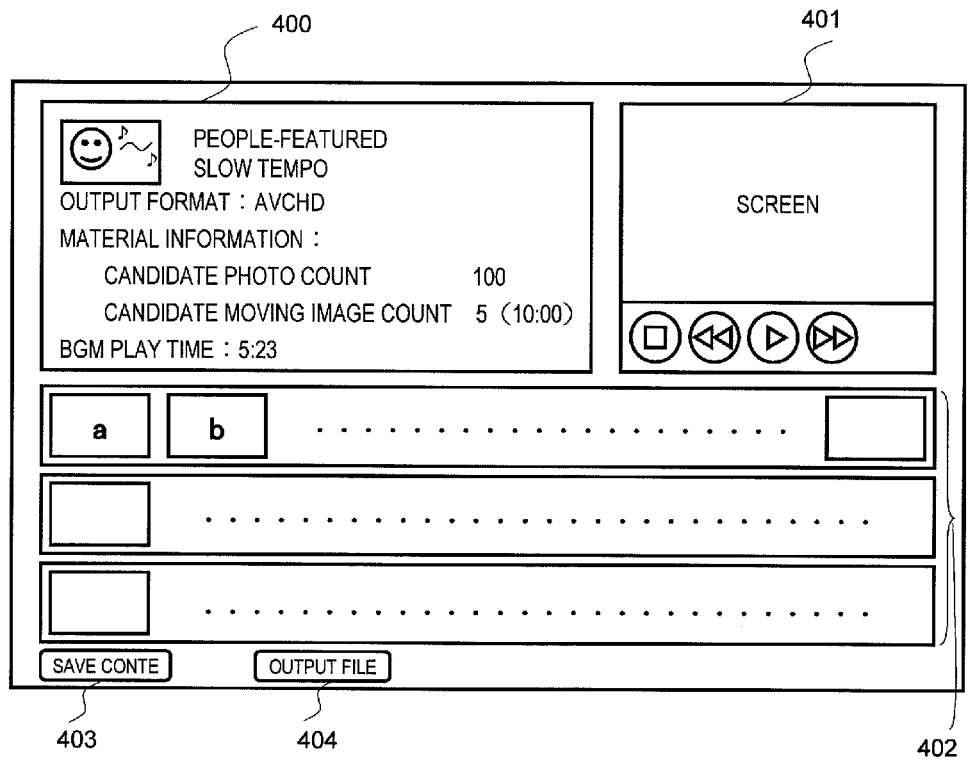

FIG.4

<TEMPLATE EXAMPLE>

ROOT - A. EFFECT (FADE-IN, 2sec)                                          ⎱ OPENING
     - B. EFFECT (CROSS-FADE, 1sec)                                       ⎰ SECTION
     - C. REPETITION (TWICE) - D. EFFECT(SLIDE-IN: RIGHT, 1sec)
                             - E. EFFECT(SLIDE-IN: LEFT, 1sec)
                             - F. EFFECT(SLIDE-IN: TOP, 1sec)             ⎱ FIRST MAIN
                             - G. EFFECT(SLIDE-IN: BOTTOM, 1sec)          ⎰ SECTION
     - H. REPETITION (THREE TIMES) - I. EFFECT(CROSS-FADE, 1sec)
                                   - J. REPETITION (TWICE) - K. EFFECT(ROTATION, 0.5sec)   ⎱ SECOND MAIN
                                                           - L. EFFECT (BURST, 0.5sec)     ⎰ SECTION
     - M. EFFECT(FADE-OUT, 2sec)                                          ⎱ ENDING
                                                                         ⎰ SECTION

IMAGE EDITING DEVICE, IMAGE EDITING METHOD, AND PROGRAM

BACKGROUND OF THE INVENTION

1. Field of the Invention

The present invention relates to an image editing technology for creating a photo movie by combining a plurality of images.

2. Description of the Related Art

There have been known electronic devices and programs for editing materials such as a plurality of still images and moving images to create a photo movie. For example, Japanese Patent Application Laid-open No. 2006-157197 discloses a photo movie creating device that creates a photo movie by combining a plurality of still images. The photo movie creating device disclosed in Japanese Patent Application Laid-open No. 2006-157197 can adjust the total play time of a photo movie as specified without changing the total count of still images used as materials. To change the total play time of a movie to a total play time specified by a user, this device adds or deletes a scene by moving a specific still image from a scene for which an effect using a plurality of still images is specified to another scene.

The photo movie creating device of Japanese Patent Application Laid-open No. 2006-157197, which edits without changing the total image count even when the user changes the play time, breaks up the story line intended by the user in some cases. For instance, this device may create a photo movie in which images switch at a fast pace although the BGM played along with the photo movie is slow in tempo. Conversely, there is also a possibility in which the created photo movie switches images at a slow pace regardless of an up-tempo BGM. Such a photo movie is a departure from the story line intended by the user and gives a viewer a sense of strangeness.

The photo movie creating device of Japanese Patent Application Laid-open No. 2006-157197 may also break up the originally planned story line by adding or deleting a scene that delivers one of display effects (switching effects set to respective images) when the order of display effects is relevant to the story line of a group of images to be displayed in succession as in a photo movie.

SUMMARY OF THE INVENTION

Embodiments of the present invention have been developed in view of the problems described above, and therefore provide an image editing device that is convenient to users in editing a group of images to be displayed in succession while maintaining a story line.

According to an exemplary embodiment of the present invention, there is provided an image editing device for creating a sequence of images from a plurality of images, including: a display controller configured to output a video signal for controlling a display device to display information about the sequence of images; an input interface configured to receive from a user settings information about a plurality of candidate images, which are candidates for images used in the sequence of images, about a total play time of the sequence of images, and about displaying effects of the respective images used in the sequence of images; and an image sequence creating unit configured to create the sequence of images using a plurality of images that are selected from the plurality of candidate images. When the total play time and the displaying effects are set, or when at least one of the total play time and the displaying effects is changed, the image sequence creating unit determines a total count of images planned to be used in the sequence of images, or an estimated value of the total count, based on the total play time and the displaying effects, and the display controller controls the display device to display image count information indicating the total count of images planned to be used or the estimated value of the total count.

In the exemplary embodiment, the display controller controls the display device to display an image of a first setting area in which the plurality of candidate images are set, an image of a second setting area in which the total play time of the sequence of images is set, and an image of a third setting area in which the displaying effects of the respective images used in the sequence of images are set.

In the exemplary embodiment, the display controller controls the display device to display the image count information along with the image of the second setting area and the image of the third setting area.

In the exemplary embodiment, the total play time of the sequence of images is determined by specifying a background music to be played along with the sequence of images.

In the exemplary embodiment, the displaying effects are determined by selecting from a plurality of types of template information prepared.

In the exemplary embodiment, the plurality of types of template information are information that defines for each image a switching effect and a play time.

In the exemplary embodiment, the display controller displays the first setting area, the second setting area, the third setting area, and the image count information in the same screen.

In the exemplary embodiment, the display controller controls the display device to further display a fourth setting area, which is for allowing the user to set a desired count of images to be used in the sequence of images, along with the first setting area, the second setting area, and the third setting area, and to display suggestion information for matching the total count of images planned to be used in the sequence of images with the set desired count of images.

According to an exemplary embodiment of the present invention, there is provided an image editing method for creating a sequence of images using a plurality of images, including: a step A of outputting a video signal for controlling a display device to display information about the sequence of images; a step B of receiving from a user settings information about a plurality of candidate images, which are candidates for images used in the sequence of images, about a total play time of the sequence of images, and about displaying effects of the respective images used in the sequence of images; a step C of creating the sequence of images using a plurality of images that are selected from the plurality of candidate images; and a step D of determining, when the total play time and the displaying effects are set, or when at least one of the total play time and the displaying effects is changed, a total count of images planned to be used in the sequence of images, or an estimated value of the total count, based on the total play time and the displaying effects, and controlling the display device to display image count information indicating the total count of images planned to be used or the estimated value of the total count.

In the exemplary embodiment, the step A includes the step of controlling the display device to display an image of a first setting area in which the plurality of candidate images are set, an image of a second setting area in which the total play time of the sequence of images is set, and an image of a third setting area in which the displaying effects of the respective images used in the sequence of images are set.

In the exemplary embodiment, the step D includes the step of controlling the display device to display the image count information along with the image of the second setting area and the image of the third setting area.

According to an exemplary embodiment of the present invention, there is provided a computer program, stored on a non-transitory computer-readable medium, to be executed by a computer mounted in an image editing device for creating a sequence of images using a plurality of images, the program causes the computer to execute the steps of: outputting a video signal for controlling a display device to display information about the sequence of images; receiving from a user settings information about a plurality of candidate images, which are candidates for images used in the sequence of images, about a total play time of the sequence of images, and about displaying effects of the respective images used in the sequence of images; creating the sequence of images using a plurality of images that are selected from the plurality of candidate images; and determining, when the total play time and the displaying effects are set, or when at least one of the total play time and the displaying effects is changed, a total count of images planned to be used in the sequence of images, or an estimated value of the total count, based on the total play time and the displaying effects, and controlling the display device to display image count information indicating the total count of images planned to be used or the estimated value of the total count.

In the exemplary embodiment, the step of outputting includes the step of controlling the display device to display an image of a first setting area in which the plurality of candidate images are set, an image of a second setting area in which the total play time of the sequence of images is set, and an image of a third setting area in which the displaying effects of the respective images used in the sequence of images are set.

In the exemplary embodiment, the step of determining includes the step of controlling the display device to display the image count information along with the image of the second setting area and the image of the third setting area.

According to the exemplary embodiments of the present invention, there may be provided an image editing device that is convenient to users in editing a photo movie while maintaining a story line.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 3 is a diagram illustrating an example of a preview screen of the liquid crystal display according to the first embodiment.

FIG. 4 is a diagram illustrating a hierarchical structure of a template according to the first embodiment.

DETAILED DESCRIPTION OF PREFERRED EMBODIMENTS

Embodiments of the present invention are described below. Before a description is given on a concrete embodiment, a basic configuration in the embodiments of the present invention is described first.

Figure 1A:
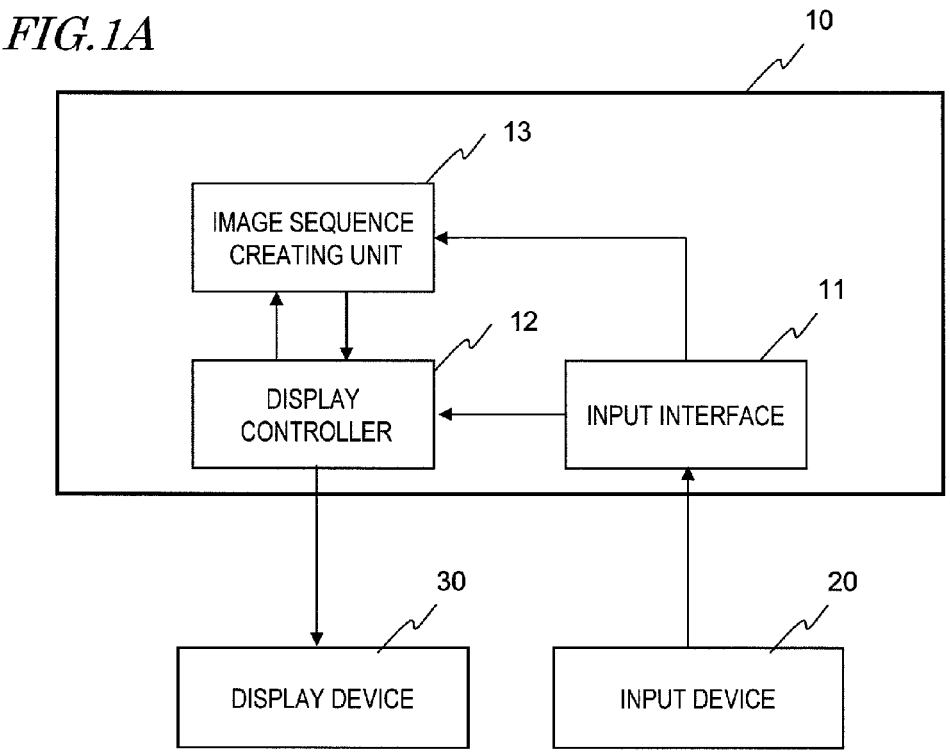
FIG. 1A is a block diagram illustrating a basic configuration of an image editing device according to embodiments of the present invention.

FIG. 1A is a block diagram illustrating the basic configuration of an image editing device according to the embodiments of the present invention. The image editing device, which is denoted by 10, can be electrically connected to an external input device 20 and an external display device 30 for use. The phrase "electrically connected" refers to the case where information is transmitted on electromagnetic waves in addition to the case where the connection is a physical connection via a cable such as a copper wire or an optical fiber. The image editing device 10 is typically an electronic device that includes a processor, such as a personal computer (hereinafter, referred to as "PC") or a portable information terminal. The image editing device 10 may be a server set up at a data center or the like. The input device 20 and the display device 30 in this case can be an input/output device built inside or connected to an electronic device that is operated by a user in a place remote from the image editing device 10.

The image editing device 10 has a function of creating a sequence of images from a plurality of images. The term "sequence of images" as used herein means a moving image consisting of a plurality of images that are displayed in succession accompanied by given displaying effects. In a typical embodiment, images constituting a sequence of images are prepared as individual still image files or moving image files. "Displaying effects" are embellishing effects presented when the respective images are displayed. Examples of displaying effects include inserting an image to the screen such that the image slides into view from a side, and displaying an image on the screen while increasing or decreasing the image in size. The term "image" includes still images and moving images. In the case where a created sequence of images includes a moving image, the moving image is played only for the duration of a play time allotted to this moving image. In other words, when the total play time of the moving image is shorter than the allotted play time, only a part of the moving image is played. In the case where each of the images is a photo or a movie consisting of a plurality of photos, the sequence of images may be called a "photo movie".

The image editing device 10 includes an input interface 11, which receives a user's operation via the input device 20, an image sequence creating unit 13, which creates a sequence of images based on input information, and a display controller 12, which controls display on the display device 30. The configurations of the respective components are described below.

The input interface 11 is a device that receives information input from the input device 20 and can be, for example, a USB port or a communication port. Information input to the input interface 11 is transferred to the image sequence creating unit 13 and the display controller 12. Alternatively, the input information may be recorded in a memory (not shown).

The display controller 12 outputs video signals that control the display device 30 to display information about a sequence of images to be created. In one embodiment, the video signals include a signal for controlling the display device 30 to display an image showing a first setting area in which a plurality of candidate images, which are candidates for images used in the sequence of images, are set, an image showing a second setting area in which the total play time of the sequence of images is set, and an image showing a third setting area in which displaying effects of the respective images used in the sequence of images are set. This configuration enables the user to set candidate images, a total play time, and displaying effects of the respective images used.

The image sequence creating unit 13 creates a sequence of images based on information about a total play time and displaying effects that are set by the user and using a plurality of images that are selected from a plurality of set candidate images. The created sequence of images is saved in, for example, a memory (not shown) to be displayed on the display device 30.

Figure 1B:
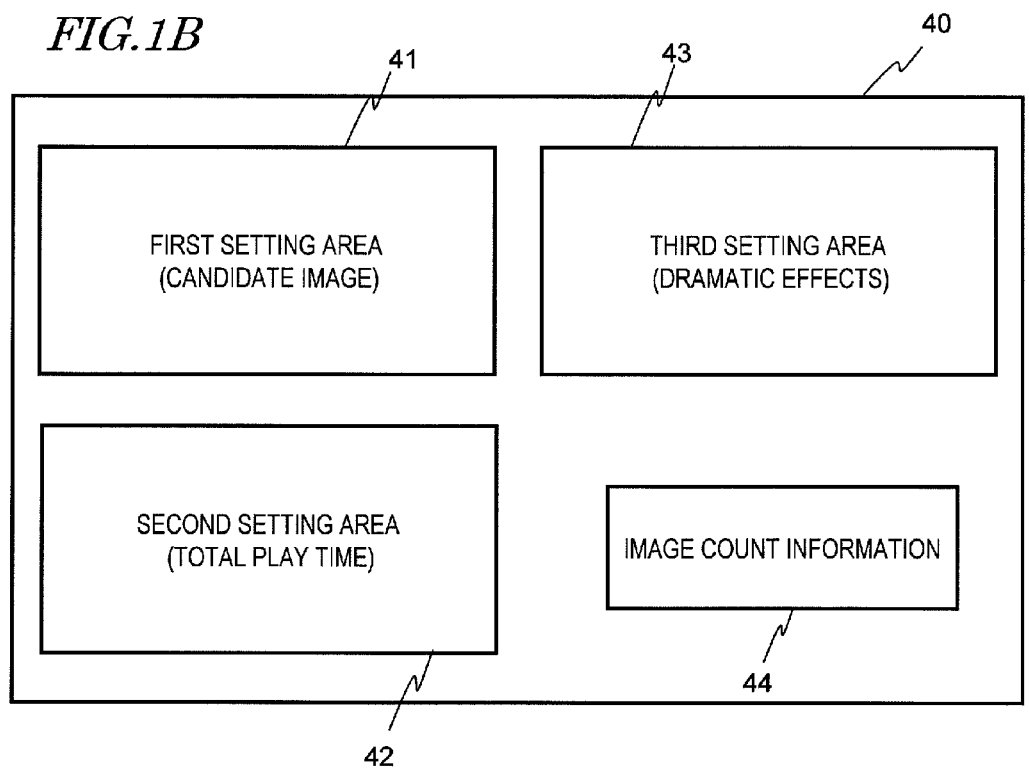
FIG. 1B is a diagram illustrating an example of a schematic configuration of a screen that is displayed on a display device according to the embodiments of the present invention.

FIG. 1B is a diagram outlining images that are displayed on a screen 40 of the display device 30 by the display controller 12 in one embodiment. The layout of the screen 40 illustrated in FIG. 1B is an example, and the screen 40 is not limited to the example. The screen 40 displays the first setting area, which is denoted by 41, the second setting area, which is denoted by 42, and the third setting area, which is denoted by 43. The setting areas which are displayed in the same window in the example of FIG. 1B may instead be displayed in separate windows. The first setting area 41, the second setting area 42, and the third setting area 43 do not need to be displayed on the same screen. However, considering users' convenience, it is preferred to display the first setting area 41, the second setting area 42, and the third setting area 43 on the same screen. The user can set various settings for creating a sequence of images in the first setting area 41, the second setting area 42, and the third setting area 43 which are displayed on the screen 40.

In the first setting area 41, a plurality of candidate images, which are candidate materials for creating a sequence of images, are set. In the second setting area 42, the total play time of the sequence of images is set. Other than the configuration in which the user is allowed to directly set a total play time, there may be employed a configuration in which the total play time is set indirectly by, for example, setting a background music (BGM) to be played along with the sequence of images. In the third setting area 43, displaying effects of images used in the sequence of images are set. Displaying effects of images are, for example, play times and switching effects set to the respective images. A configuration may be employed in which the user sets a displaying effect for each image by, as will be described later, selecting an arbitrary template from a plurality of templates in which various displaying effects are defined in advance.

In the embodiments of the present invention, when the total play time and displaying effects are set, or when at least one of the total play time and displaying effects is changed, the image sequence creating unit 13 determines the total count of images that are planned to be used or an estimated value of the total count of images to be used, based on information indicating the set or new total play time and displaying effects.

The display controller 12 then controls the display device 30 to display information indicating the total count of images that are planned to be used or an estimated value of the total count of images to be used (image count information 44). This enables the user to immediately grasp how many images are to be used when at least one of the total play time and displaying effects is changed, thereby making it easy for the user to determine whether or not to change the count of candidate images, displaying effects, and the total play time.

Note that, in the example illustrated in FIG. 1B, the image count information 44 is displayed along with the first setting area 41, the second setting area 42, and the third setting area 43, but the present invention is not limited thereto. The image editing device 10 may be configured so as to display the image count information 44 on the display device 30 alone, depending on the input user settings information. Alternatively, the image count information 44 may be displayed along with the second setting area 42 and the third setting area 43, while the first setting area 41 may be displayed on, for example, a screen that is displayed before a transition to the screen 40. When the image count information 44 is displayed along with the second setting area 42 and the third setting area 43, the user may immediately perform the operation of changing the total play time or the displaying effects by referring to the image count information 44, which is highly convenient.

Preferred embodiments of the present invention are described below.

First Embodiment

An image editing device according to a first embodiment of the present invention is described first. In this embodiment, a personal computer (PC) functions as the image editing device.

Figure 1C:
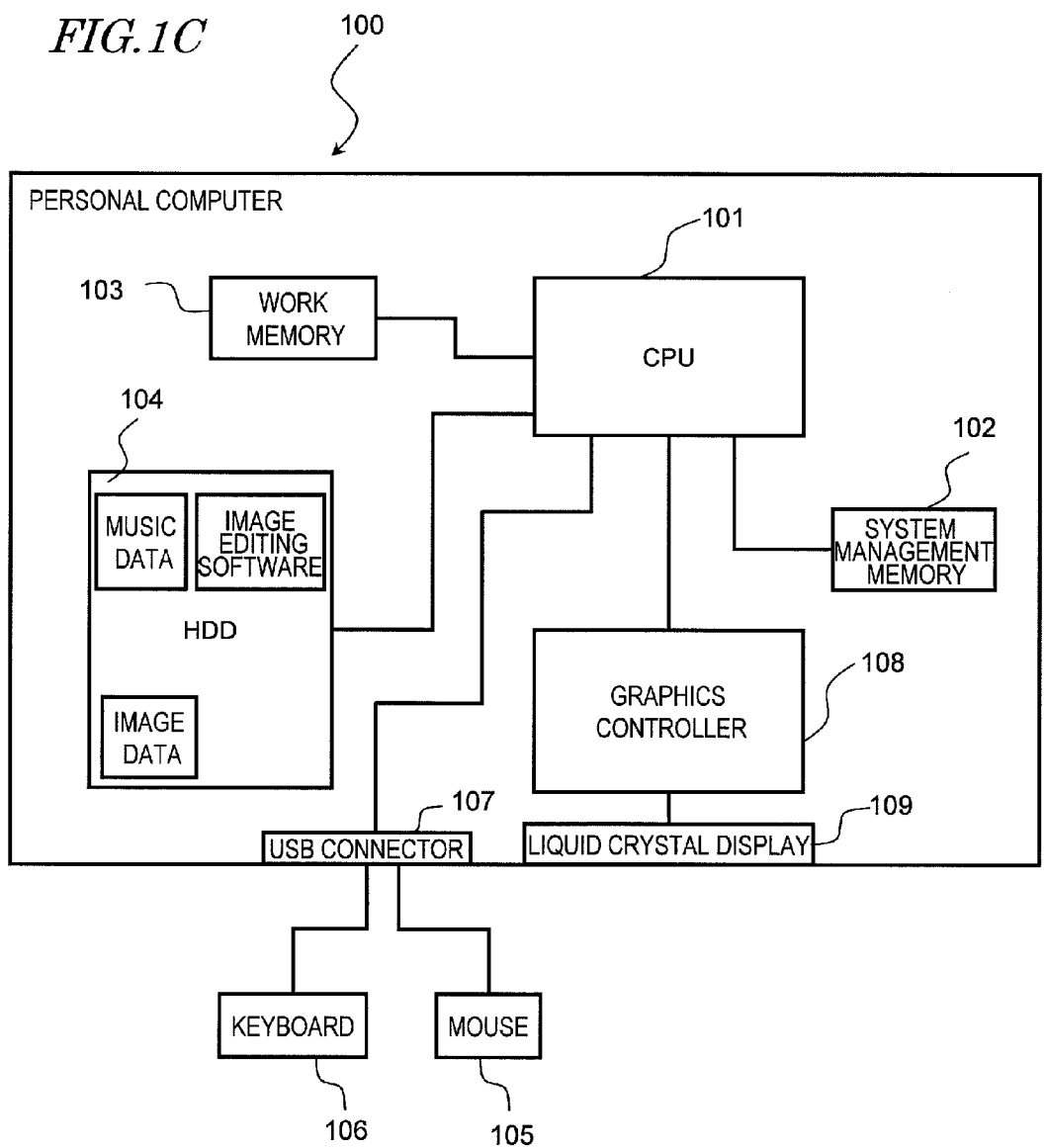
FIG. 1C is a block diagram illustrating a configuration of a PC according to a first embodiment.

FIG. 1C is a block diagram illustrating an overall system configuration of a PC 100. The PC 100 according to the first embodiment is capable of editing a group of images to be displayed in succession in a manner that is more true to the story line than in prior art. This embodiment deals with a case of creating a photo movie (hereinafter, simply referred to as "movie") as an example of a group of images to be displayed in succession. In creating a movie, the user can employ a prepared BGM of default settings or a BGM registered at the user's discretion as a BGM to be played along with the movie. Movie creating according to this embodiment involves creating a story and a conte by arranging a plurality of input images in sequence along a template that is selected by the user from a plurality of prepared templates and along a set BGM. A "template" as used herein is form information which describes display times of images arranged in sequence and repetition patterns of image switching effects. A "story" is information showing the overall order of switching effects in which the numbers of times of repetition patterns written in the template are adjusted to the length of the BGM. A "conte" is information that allocates an input image to each switching effect of the story. The PC 100 performs given encoding processing based on the conte to convert the conte into a moving image file, and outputs the moving image file.

The system configuration and operation are described in more detail below.

1. System Configuration

The system configuration of the PC 100 is described first with reference to FIG. 1C. FIG. 1C illustrates the overall configuration of the PC 100. The PC 100 includes a central processing unit (CPU) 101, a system management memory 102, a work memory 103, a hard disk drive (HDD) 104, a mouse 105, a keyboard 106, a USB connector 107, a graphics controller 108, and a liquid crystal display 109. The PC 100 can include other components than the ones illustrated in the drawing, but those components are irrelevant to the essence of the present invention and are therefore omitted from the drawing. The PC 100 which is a notebook PC that includes the liquid crystal display 109 in this embodiment may also be a desktop PC. In this embodiment, the CPU 101 has the function of the image sequence creating unit 13 of FIG. 1A, the graphics controller 108 has the function of the display controller 12 of FIG. 1A, and the USB connector 107 has the function of the input interface 11 of FIG. 1A.

The CPU 101 executes processing of the PC 100. The CPU 101 is electrically connected to the system management memory 102, the work memory 103, the HDD 104, the graphics controller 108, and the USB connector 107. The CPU 101 can change an image displayed on the liquid crystal display 109 via the graphics controller 108. The CPU 101 also receives information about an operation made by the user with the mouse 105 and/or the keyboard 106. Though not shown, the CPU 101 also handles the overall system control which includes controlling power supply to the components of the PC 100.

The system management memory 102 is a memory that holds an operating system (OS) and the like. The system management memory 102 also stores system time, which is updated by the running of a program of the OS by the CPU 101.

The work memory 103 is a memory that temporarily stores information necessary for the CPU 101 to execute various types of processing. The CPU 101 follows a template selected by the user when creating a conte from a group of sequential images to be displayed in succession by arranging images in sequence. The CPU 101 stores in the work memory 103 information about the selected template, information about the story and the conte that are being created, and the like. Details of the template information are described later.

The mouse 105 is a pointing device used by the user for an editing operation. The user operates the mouse 105 to select image data, music data, and a template on the screen of image editing software.

The keyboard 106 is a keyboard device which allows the user to input letters and the like in an editing operation.

The USB connector 107 is a connector for connecting the mouse 105 and the keyboard 106 to the PC 100.

The graphics controller 108 is a device that visualizes screen information computed by the CPU 101, and transmits the screen information to the liquid crystal display 109.

The liquid crystal display 109 is a display device that displays screen information visualized by the graphics controller 108. The screen information may be displayed on an external display instead of the liquid crystal display 109.

The CPU 101 reads image editing software out of the HDD 104 and stores the image editing software in the work memory 103 to activate and execute the image editing software. The CPU 101 also executes the following processing in accordance with a program of the image editing software:

(1) Receiving via the USB connector 107 a selection operation and an editing operation which are made by the user with the mouse 105 and/or the keyboard 106.

(2) Reading the play time of music data that is selected or registered by the user for a story to be created.

(3) Reading what is written in a template that is selected by the user.

(4) Creating a conte by associating the story with input images based on the result of comparing the play time of the story that is defined by the template against the play time of the music data to be used.

(5) Sending image information of the created conte to the graphics controller 108 in order to display the conte on the liquid crystal display 109.

2. Selection Screen Configuration

Figure 2:
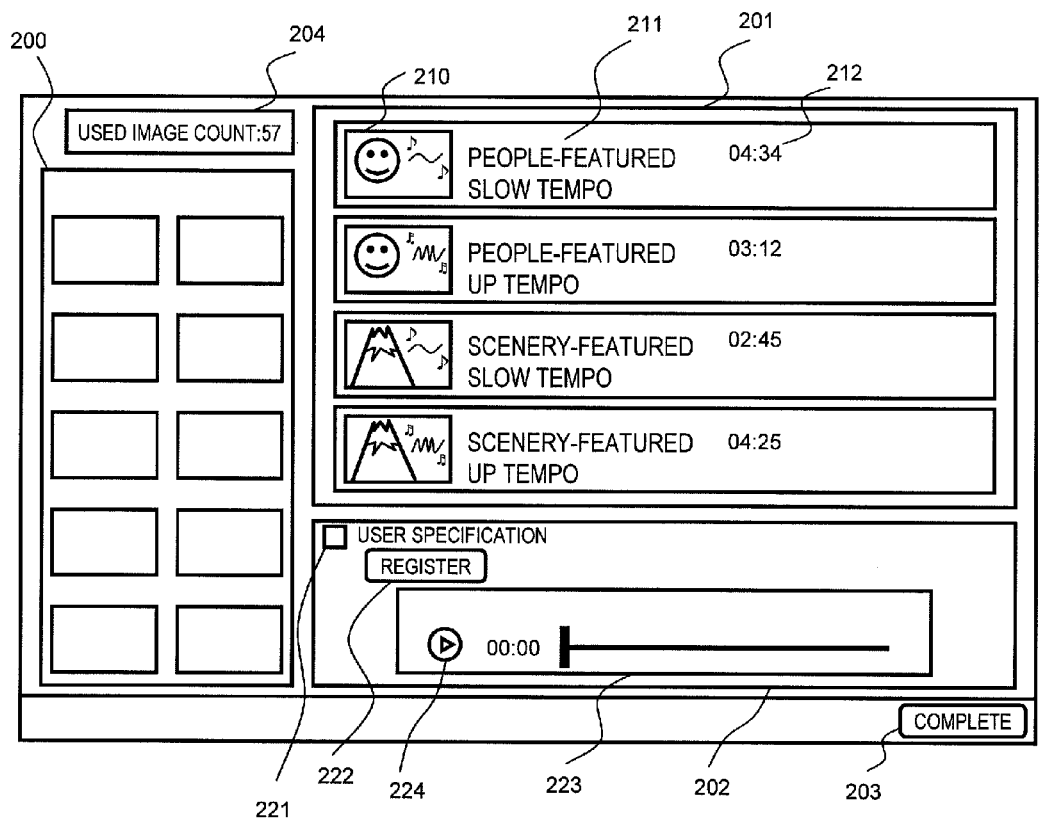
FIG. 2 is a diagram illustrating an example of a selection screen that is displayed on a liquid crystal display according to the first embodiment.

Described next with reference to FIG. 2 is the configuration of the selection screen displayed on the liquid crystal display 109. FIG. 2 is a diagram illustrating an example of the selection screen that is displayed on the liquid crystal display 109.

As illustrated in FIG. 2, the selection screen displayed on the liquid crystal display 109 includes a material selection area 200, which displays candidate image files, a template selection area 201, which displays templates that can be selected, a BGM selection area 202, which is for selecting a BGM, a "complete" button 203, which is for finish setting, and a total used image count display area 204, which displays the count of images that are used under the current settings.

The total used image count display area 204 is an area for displaying the count of images planned to be used in a story that is created when the "complete" button 203 is pressed under the current settings. Details of how the image count is calculated are described later.

The material selection area 200 is an area for displaying image data that serves as a material for creating a story. The image data that can be used as the material includes still image data and moving image data. As illustrated in FIG. 2, a plurality of pieces of image data are displayed in the material selection area 200. The image data displayed in the material selection area 200 may be all of image data stored in the HDD 104, or may be selectively extracted image data which is stored in a specific folder, or may be image data further selected by the user from among image data stored in a specific folder. The image data displayed in the material selection area 200 is a candidate for an image that is incorporated in a conte being created. The material selection area 200 may be designed so that the user can set a priority level as image data to be incorporated in a story to image data displayed in the material selection area 200. In this case, image data to which a high priority level is set can be selected preferentially when it is not possible to employ all images displayed in the material selection area 200 (as in the case where the play time is short). A conte that employs images that the user wants to use (or a moving image file of a given format) is thus created.

The template selection area 201 is an area for displaying templates that can be selected by the user. Templates that can be selected by the user are, for example, ones displayed in the template selection area 201 of FIG. 2 which are a "people-featured slow-tempo template", a "people-featured up-tempo template", a "scenery-featured slow-tempo template", and a "scenery-featured up-tempo template". The "people-featured slow-tempo template" is a template describing a story for which images of photographed people are mainly extracted and image switching effects suitable for a slow-tempo BGM are used. Similarly, the "people-featured up-tempo template" is a template describing a story for which images of photographed people are mainly extracted and image switching effects suitable for an up-tempo BGM are used. The "scenery-featured slow-tempo template" is a template describing a story for which images of photographed sceneries are mainly extracted and image switching effects suitable for a slow-tempo BGM are used. The "scenery-featured up-tempo template" is a template describing a story for which images of photographed sceneries are mainly extracted and image switching effects suitable for an up-tempo BGM are used. The templates of FIG. 2 are given as an example and templates other than those may be prepared.

Each template display area of the template selection area 201 displays an image 210, which represents an image of the template, a template name 211, and a BGM play time 212, which is a default setting of the template. The user can select a desired template from a plurality of types of templates by operating the mouse 105. The user can change the current template to another template to change the atmosphere of a story to be created. When the user changes the current template to another template, the CPU 101 updates the image count displayed in the total used image count display area 204.

The BGM selection area 202 is an area that allows the user to specify an arbitrary BGM as a BGM used in the story. The BGM selection area 202 includes a user specification checkbox 221, a "register" button 222, and a sample player 223. The user can enable/disable the user specification checkbox 221 by operating the mouse 105. When the user specification checkbox 221 is disabled, the CPU 101 uses a default BGM set to the template in creating a story. When the user specification checkbox 221 is enabled, a BGM specified by the user is used in story creation. The play time of a BGM determined here as the BGM to be used equals the play time of the story to be created.

The user can register a BGM to be used in creating a story by operating the mouse 105 and pressing the "register" button 222. When the user presses the "register" button 222, the CPU 101 displays the contents of a folder storing music data on the liquid crystal display 109. The user looks at the displayed folder contents to select desired music data through mouse operation or the like. The user can thus register a BGM to be used in story creation. The user can also listen to an audio sample of the selected BGM by operating the mouse 105 and pressing a sample button 224. When the user changes the current BGM to another BGM, the CPU 101 updates the image count displayed in the total used image count display area 204.

The image count displayed in the total used image count display area 204 is calculated based on a template that is selected in the template selection area 201 and a BGM that is selected in the BGM selection area 202. By referring to the image count displayed in the total used image count display area 204, the user can determine with ease whether to change the current template to another template in the template selection area 201. Referring to the image count displayed in the total used image count display area 204 also makes it easy for the user to determine whether to change the current BGM to another BGM in the BGM selection area 202 (whether to change the play time) and whether to add or delete an image in the material selection area 200.

The "complete" button 203 is for completing the selection of material images, a template, and a BGM that are used to create a story. The user can complete the selection by operating the mouse 105 and pressing the "complete" button 203. When the selection for creating a story is completed, a story is created based on image data selected in the material selection area 200, a template selected in the template selection area 201, and BGM information specified in the BGM selection area 202. The CPU 101 creates a conte by associating images with the created story.

3. Check Screen Configuration

Described next with reference to FIG. 3 is the configuration of a check screen displayed on the liquid crystal display 109.

FIG. 3 is a diagram illustrating an image of the check screen of the liquid crystal display 109. A press of the "complete" button 203 of FIG. 2 causes a transition to the check screen of FIG. 3.

As illustrated in FIG. 3, the check screen displayed on the liquid crystal display 109 includes a story information display area 400, a preview area 401, a storyboard area 402, a "save conte" button 403, and an "output file" button 404.

The story information display area 400 is an area for displaying information about items selected by the user on the selection screen. The displayed information includes the count of selected materials, the selected template name, and the play time of the selected BGM. The count of selected materials refers to the count of still images that are candidates for images to be incorporated in the story and the count of candidate moving images. Though not shown, the story information display area 400 may additionally display the count of actually employed still images and the count of actually employed moving images. This way, the user can check how many of candidate images are actually employed.

The preview area 401 is a screen where the created conte is played. The user can actually check the specifics of the created conte in the form of a video.

The storyboard area 402 is an area for displaying images used in the created movie. In the storyboard area 402, a plurality of rectangles (a, b, ... ) are aligned in an order that corresponds to the display order in the story. Each rectangle displays one of images extracted from images that have been displayed in the material selection area 200. Though not shown, the storyboard area 402 may additionally display an icon that represents an effect of a switch between images. Alternatively, the storyboard area 402 may additionally display for each rectangle the play time of an image that corresponds to the rectangle. This way, the user can check which materials are arranged in what order in the story to be played with what effects for how long play times.

The "save conte" button 403 is selected by operating the mouse 105. The user can press the "save conte" button 403 to save in the HDD 104 conte information for managing which materials are arranged in what order to be played with what switching effects for how long play times. Though not shown, a "read conte" button may be provided in a screen of an upper hierarchy level, for example, the selection screen of FIG. 2, so that previously saved conte information can be read.

The "output file" button 404 is selected by operating the mouse 105. The user can press the "output file" button 404 to create a moving image file based on the created conte information. The output format of the created moving image file may be selected by the user in advance. For example, in the case where the user has chosen the AVDHD (a registered trademark) file format, a moving image file of the AVCHD® file format is created.

4. Template Configuration Information

Information held in templates is described next. FIG. 4 is a diagram illustrating the hierarchical structure of templates according to this embodiment.

A template is information describing what switching effects are sequentially arranged in what order when creating a story. The template describes for each switching effect that is numbered how long play time is allocated. The CPU 101 arranges selected materials in sequence in accordance with the order of switching effects that is defined in the template.

The term "switching effect" means a displaying effect presented when one image switches to another image. There are a plurality of switching effect patterns such as fade-in, cross-fade, slide-in, and rotation. In this embodiment, unique switching effect patterns are set in advance to each template together with the play times of the respective patterns. Templates in this embodiment have a tree structure made up of repetition nodes and effect nodes.

An example of the templates is described below with reference to FIG. 4. The template of FIG. 4 has an opening section, a first main section, a second main section, and an ending section. While this embodiment takes as an example a case where two main sections, the first main section and the second main section, are included, a template may have only one main section or three or more main sections.

The opening section, the first main section, the second main section, and the ending section are each constituted of an "effect node" and/or a "repetition node", which has one or more effect nodes. An effect node has material play time information and information indicating the type of a switching effect. A repetition node can have as a child node an effect node and/or another repetition node, whereas an effect node cannot have a child node. The CPU 101 displays images in accordance with play times and switching effects defined by the respective effect nodes. A repetition node has information for repeating an effect node and/or another repetition node that belongs to the repetition node a specified number of times (repetition count information). A series of nodes (Child Node 1, Child Node 2, ... Child Node n) designated as child nodes of a repetition node can be repeated for a plurality of times. To repeat once, the display order is "(Child Node 1)→(Child Node 2)→ ... →(Child Node n)". To repeat twice, the display order is "(Child Node 1)→(Child Node 2)→ ... →(Child Node n)→(Child Node 1)→(Child Node 2)→ ... →(Child Node n)".

The opening section is written so that the play time per image is rather long in order to allow the user to superimpose title text of the story on an image. In the example of FIG. 4, the opening section is configured so that 2 seconds of "A. fade-in" effect is followed by 1 second of "B. cross-fade" effect. The opening section here uses two images. Specifically, the two images used are an image inserted by the "A. fade-in" effect to a black screen being displayed on the liquid crystal display 109 and an image inserted to the screen by the "B. cross fade" effect subsequently to the first image.

The first main section and the second main section, where main images of the story are placed, are written so that switching effects that build up are set. The switching effect set to the second main section which is a climax is more showy than the one set to the first main section. In the example of FIG. 4, the first main section has as child nodes four switching effects, which are 1 second of "D. slide-in: right" effect, 1 second of "E. slide-in: left" effect, 1 second of "F. slide-in: top" effect, and 1 second of "G. slide-in: bottom" effect. The first main section is constituted of a repetition node C for repeating these four child nodes, and the repetition count is initially set to twice. The second main section is constituted of a repetition node H for repeating a child effect node and a child repetition node. The child effect node has 1 second of "I. cross-fade" effect. The child repetition node is a repetition node J for repeating two grandchild nodes, one of which has 0.5 seconds of "K. rotation" effect and the other of which has 0.5 seconds of "L. burst" effect. The repetition count of the repetition node J here is initially set to twice. The repetition count of the repetition node H is initially set to three times.

The ending section, where images that wrap up the story are placed, is set so that the play time per image is relatively long. In the example of FIG. 4, the ending section is constituted of an image that has 2 seconds of "M. fade-out" effect.

In the case where a story is created with the repetition counts set to the initial settings given above, the order of the effect nodes is "(A. fade-in: 2 sec)→(B. cross-fade: 1 sec)→(D. slide-in: right: 1 sec)→(E. slide-in: left: 1 sec)→(F. slide-in: top: 1 sec)→(G. slide-in: bottom: 1 sec)→(D. slide-in: right: 1 sec)→(E. slide-in: left: 1 sec)→(F. slide-in: top: 1 sec)→(G. slide-in: bottom: 1 sec)→(I. cross-fade: 1 sec)→(K. rotation: 0.5 sec)→(L. burst: 0.5 sec)→(K. rotation: 0.5 sec)→(L. burst: 0.5 sec)→(I. cross-fade: 1 sec)→(K. rotation: 0.5 sec)→(L. burst: 0.5 sec)→(K. rotation: 0.5 sec)→(L. burst: 0.5 sec)→(I. cross-fade: 1 sec)→(K. rotation: 0.5 sec)→(L. burst: 0.5 sec)→(K. rotation: 0.5 sec)→(L. burst: 0.5 sec)→(M. fade-out: 2 sec)". These display times add up to 22 seconds. The templates thus have a tree structure made up of repetition nodes and effect nodes.

5. Image Editing Operation

Figure 5:
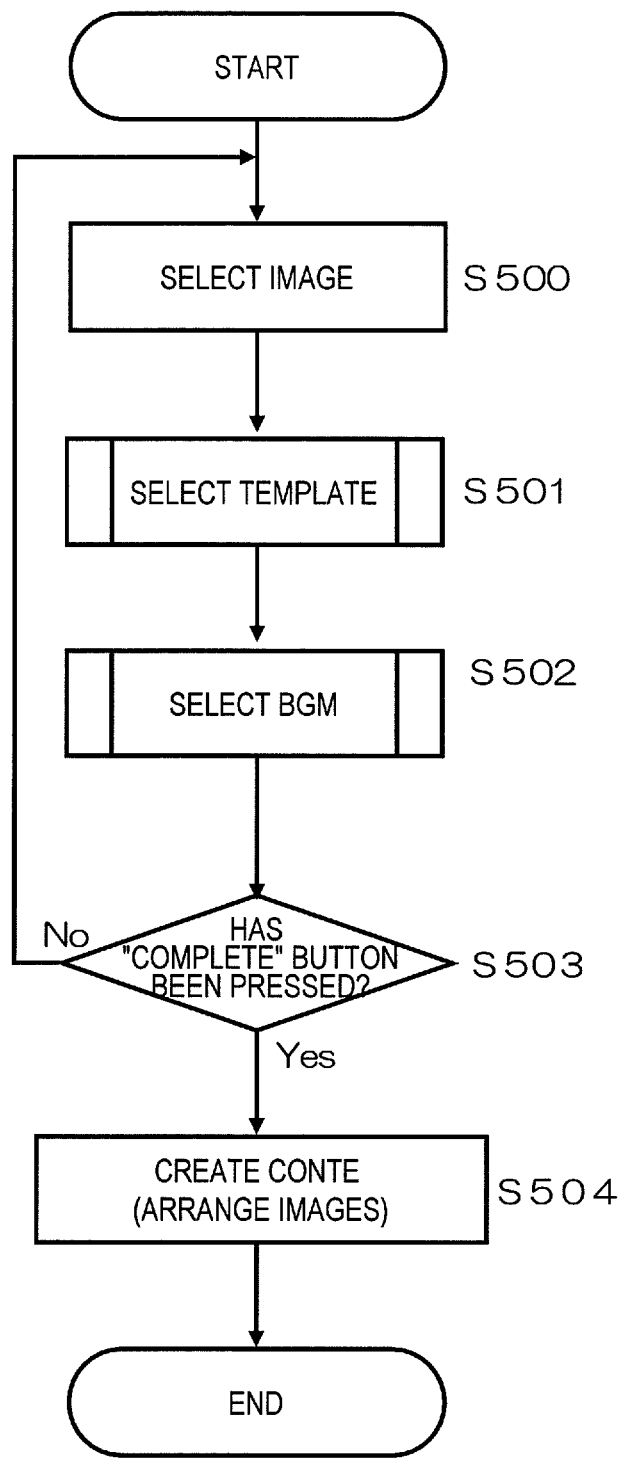
FIG. 5 is a flow chart outlining an image editing operation according to the first embodiment.

Described next is a procedure of creating a story based on selected materials, a selected template, and a selected BGM. FIG. 5 is a flow chart outlining an image editing operation in this embodiment.

The user first selects images (candidate images) he/she wants to use for the creation of a story (S500). When images are selected, the CPU 101 displays the selected images in the material selection area 200. The user may further set priority levels as described above. The image selection may be implemented by, for example, providing a "select image" button in the material selection area 200 of FIG. 2 so that the user's press of this button causes a transition to the image selection screen, or by adding or deleting an image file with drag-and-drop.

The user next selects a template to be used for the creation of the story (S501). When the template is selected, the CPU 101 highlights the selected template in the template selection area 201. The user then selects a BGM to be used for the creation of the story (S502). In this step, the user determines whether to employ a default BGM of the template. In the case where a default BGM of the selected template is not to be used, the user enables the user specification checkbox and registers desired music data in the manner described above. The CPU 101 employs the music data registered by the user as the BGM. In the case where the default BGM of the selected template is to be used, on the other hand, the user disables the user specification checkbox in the manner described above. The CPU 101 in this case employs the default BGM of the selected template. Steps S500 to S502 are operations where the user makes selections at his/her discretions, and the order of these operations can be changed without causing any problem.

When the user makes a selection operation of Step S501 or S502, the image count displayed in the total used image count display area 204 is dynamically updated to reflect the result of the selection. Detailed operations in Steps S501 and S502 are described later.

According to this embodiment, when the current BGM (the play time) is changed to another BGM or the current template is changed to another template, an updated count of images used is displayed immediately, which helps the user in determining what needs to be done in order to create the movie that he/she wants to make. The user creating a conte probably performs an editing operation with a somewhat concrete image of the finished movie in mind. In the case where the user has in mind an image of the finished movie of a certain degree of concreteness, the user is probably aware of which image data displayed in the material selection area 200 is of images that he/she wants to use while performing an editing operation. In other words, the user is probably conscious of the count of images that he/she desires to use in the creation of the conte. If the total used image count displayed is, for example, lower than the desired count, the user can adjust the used image count in order to use the desired count of images by changing the current template to another template or the current BGM to another BGM.

The total used image count possibly becomes lower than the desired count in the following three cases: The first case is when the user selects too short a BGM. In this case, the user can easily determine that changing the current BGM to a longer one is necessary in order to reach the count of images that the user desires to use. The second case is when the selected template is for a slow image switching tempo. The user in this case can easily determine that selecting a template for a faster image switching tempo is necessary in order to reach the count of images that the user desires to use. The third case is when the count of images that the user desires to use is too high. The user in this case can easily determine that material images displayed in the material selection area 200 need to be narrowed down to display image candidates in order to make a concise, quality movie. The CPU 101 can prompt the user to narrow down images by presenting the total used image count on the selection screen of FIG. 2.

As described, by referring to the used image count displayed in the total used image count display area 204 and executing at least one of Steps S500 to S502, the user can adjust the count of images used without moving to the check screen of FIG. 3. Therefore, the determination to change the settings information for the purpose of creating a quality movie can be easily made.

After selecting material images, a template, and a BGM (the play time) that are to be used in the creation of a conte, the user presses the "complete" button 203 to enter the selected items (S503). In this embodiment, a story is already created in Steps S501 and S502. The CPU 101 creates a conte by allocating material images to the story (S504).

In Step S504, the CPU 101 sorts images displayed in the material selection area 200 by photographing date/time, and allocates the sorted images to the respective effect nodes in the story in order. In the case where the count of candidate images as materials is lower than the count of effect nodes in the story, the same image is used a plurality of times at random, for example. In the case where the count of candidate images as materials is higher than the count of nodes in the story, materials to be used are selected by, for example, the following conditions:

Condition 1: Selecting materials so that the selected materials are distributed evenly throughout the entire photographing date/time span.

Condition 2: In the case where a people-featured template is selected, preferentially selecting images in which the main subject is a person.

Condition 3: In the case where a scenery-featured template is selected, preferentially selecting images in which the main subject is a scenery.

Condition 4: In the case where priority levels are set to images displayed in the material selection area 200 in Step S500, preferentially selecting images that have high priority levels.

Whether the main subject of an image is a person or a scenery can be determined based on the characteristics of the image. The CPU 101 may execute this determination each time a conte is created, or may refer to, when creating a conte, information that is prepared for each image to indicate what the main subject of the image is.

The CPU 101 finishes the image editing operation through the operations described above.

6. Story Creating Operation

Figure 6:
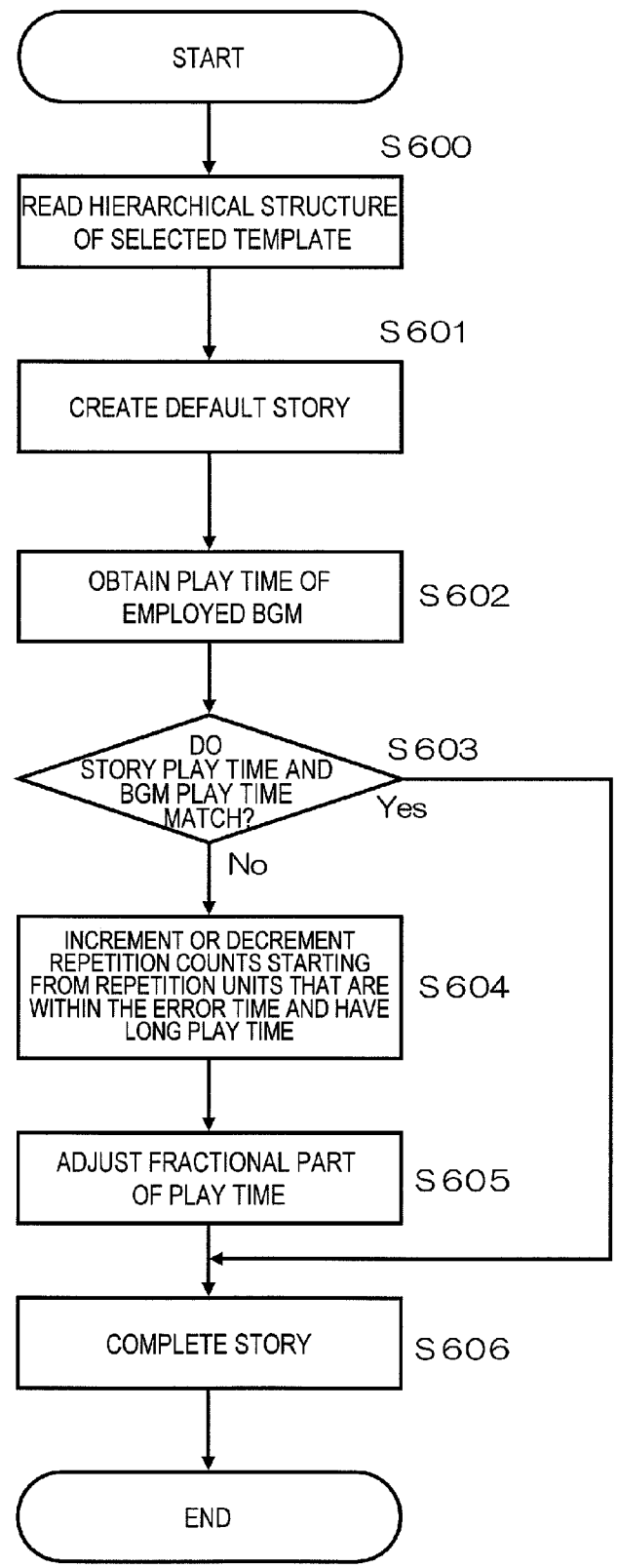
FIG. 6 is a flow chart illustrating details of story making processing according to the first embodiment.

Described next is a detailed operation of story creation which is executed in Steps S501 and S502. FIG. 6 is a flow chart illustrating details of story creation according to this embodiment.

The CPU 101 first reads information of a template selected in Step S501 (S600). The CPU 101 next creates a story with repetition counts set to default counts of the template (S601). The play time of the story in the example illustrated in FIG. 4 is 22 seconds. The CPU 101 next obtains the play time of a BGM selected in Step S502 (S602). The description here takes as an example a case where a BGM that lasts 34.5 seconds is selected.

The CPU 101 then compares the play time of the created story (22 seconds) and the play time of the BGM (34.5 seconds) to see if the two match (S603). In the case where the play time of the created story and the play time of the BGM match, the CPU 101 determines that the story has been completed (S606) and ends the processing. In the case where the play time of the created story and the play time of the BGM do not match, the CPU 101 increases or decreases the repetition counts to match the play time of the story with the play time of the BGM (S604 and S605). This procedure of Steps S604 and S605 is described in more detail.

First, all repetition nodes in the template are listed to check for each repetition node a unit repetition time u which is a time per repetition. Hereinafter, the unit repetition time of a node X is expressed as $u(X)$. The template of FIG. 4 has three repetition nodes, the node C, the node H, and the node J. The repetition length of the node C per repetition is equal to the length of "node D+node E+node F+node G" and $u(C)$ is therefore (1+1+1+1) seconds=4 seconds. Similarly, $u(J)$ is (0.5+0.5) seconds=1 second. The repetition length of the node H, which includes the repetition node J as a child node, is calculated by using the initially set repetition count (=2 seconds) of the node J, and $u(H)=(1+2*u(J))$ seconds=$(1+2*1)$ seconds=3 seconds.

The CPU 101 next calculates the difference between the play time of the story and the play time of the BGM (hereinafter, referred to as "error time"), and increases or decreases the repetition counts so that the difference is reduced to 0. Specifically, when the story play time is longer than the BGM play time, the story play time is adjusted by decrementing the repetition counts. When the story play time is shorter than the BGM play time, the story play time is adjusted by incrementing the repetition counts. For instance, when the story play time is shorter than the BGM play time, the CPU 101 sequentially selects nodes that are to be adjusted in repetition count in accordance with the following concepts:

Condition 1: Nodes whose unit repetition time u is long and within the error time are preferentially selected. The repetition count of a selected repetition unit is then incremented by 1.

Condition 2: In the case where a plurality of repetition nodes have equal unit repetition lengths u, one of these repetition nodes may be selected at random. However, in the case where the repetition nodes include a repetition node that has already been increased or decreased in repetition count, repetition nodes that have not been increased or decreased in repetition count are selected preferentially. The repetition count of the selected repetition unit is then incremented by 1.

Condition 3: In the case where a repetition node whose unit repetition time is $u1$ is selected by Condition 1 and the repetition count has been incremented by 2 for every node that has the unit repetition time u1, further incrementing the repetition count by 1 is sometimes regarded by the user as too many repetitions of the same repetition unit. Condition 3 may be used to avoid this. For example, when the second longest unit repetition time of a node to u1 is given as u2 and u2 satisfies u1<u2*2, a repetition node having u2 may be selected instead of the repetition node having u1 to increment the repetition count of the node having u2 by 1. If there is no node that satisfies u1<u2*2, the node having u1 is selected again. In other words, the repetition count of the node having u1 is further incremented by 1.

Condition 4: When the error time becomes less than the minimum value of the repetition time of the node, the repetition count adjustment in Step S604 is ended.

When the error time becomes less than the minimum value of the repetition time of the node, the CPU 101 finely adjusts the play time of each node to reduce the remaining error time to 0. Needless to say, the fine adjustment of the play time is not required in the case where the error time has already been reduced to 0 by applying Conditions 1 to 3 described above. To finely adjust the error time, the CPU 101 lists effect nodes in the story. The CPU 101 selects the effect nodes in descending order of play time, and modifies the play time of the selected node to close the gap from the BGM play time (S605). The range of time that can be changed in a single node is, for example, within ±10% of the original play time of the effect node.

The operation specifics of Steps S605 and S605 are described below taking as an example a case where the length of the BGM is 34.5 seconds. The error time which is the difference between the play time of the story and the play time of the BGM is 12.5 seconds in this case. First, the CPU 101 increments the repetition count of the node C (4 seconds) under Condition 1. The remaining error time is now 8.5 seconds. The CPU 101 next increments the repetition count of the node C (4 seconds) under Condition 1 again. The remaining error time is now 4.5 seconds. Then, the play time of the node C satisfies Condition 1, but the repetition node C has already been selected twice at this point, and hence the repetition count of the node H (3 seconds) is incremented under Condition 3. This makes the remaining error time 1.5 seconds. The CPU 101 next increments the repetition count of the node J (1 second) under Condition 1. The remaining error time is now 0.5 seconds. This leaves no repetition nodes that have a repetition time longer than the remaining error time. Consequently, Condition 4 is applied and Step S604 is ended. The story at this point is expressed in node symbols as follows:

A-B-(D-E-F-G)-(D-E-F-G)-(D-E-F-G)-(D-E-F-G)-(I-(K-L)-(K-L))-(I-(K-L)-(K-L))-(I-(K-L)-(K-L))-(I-(K-L)-(K-L))-M

The play times of the respective nodes have a relation "A=M>B=D=E=F=G=I>K=L". Therefore, lengthening the play times of the nodes A (2 seconds), M (2 seconds), and B (1 second) by 0.2 seconds, 0.2 seconds, and 0.1 seconds, respectively, 0.5 seconds in total, eliminates the difference. The story length is thus matched to 34.5 seconds.

In the manner described above, the repetition count of each repetition unit defined in the template that is selected in Step S501 is determined, and a fine adjustment is made to the fractional part of the play time. The initially set repetition counts are applied as they are in the case where the play time of the story and the play time of the BGM match in Step S603.

The CPU 101 finishes the story creating operation through these operations. The story creating procedure described above is just an example, and any other method can be used to edit a story in a manner that fits the length of the story to the play time of a BGM.

7. Total Used Image Count Calculation

A procedure of calculating the count of images planned to be used based on a selected template and a selected BGM is described next with reference to FIGS. 7 to 9.

Figure 7:
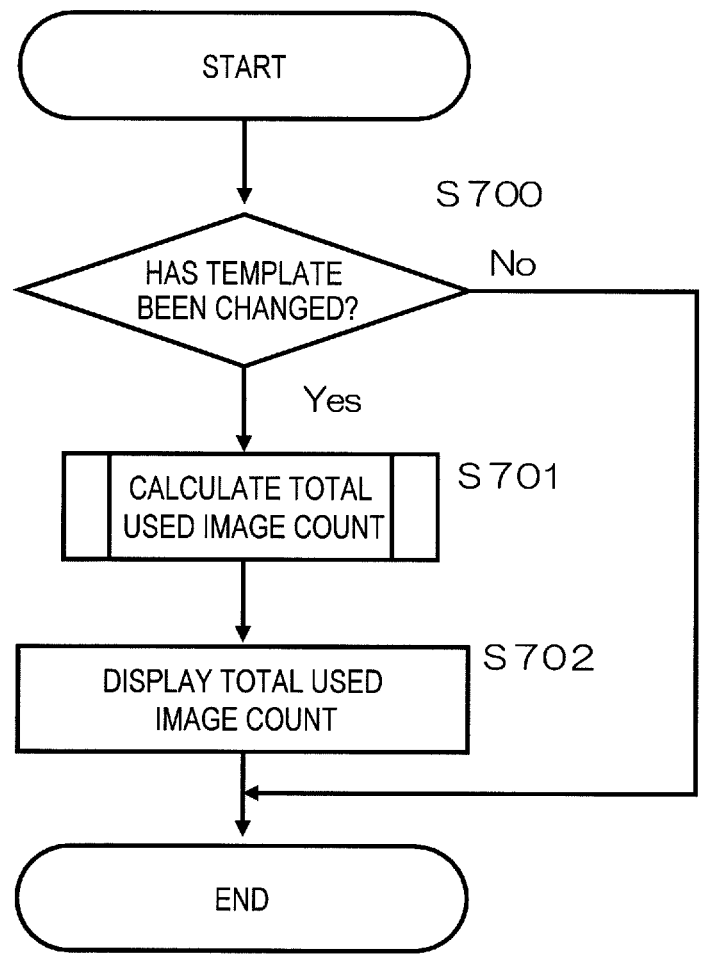
FIG. 7 is a flow chart illustrating details of template selecting processing according to the first embodiment.

FIG. 7 is a flow chart illustrating details of the template selecting operation. The CPU 101 checks whether or not the previously set template has been changed to another template (S700). In the case where the previously set template has been changed to another template, the CPU 101 recalculates the total used image count (S701). The CPU 101 then updates the display of the total used image count display area 204 of FIG. 2 (S702).

Figure 8:
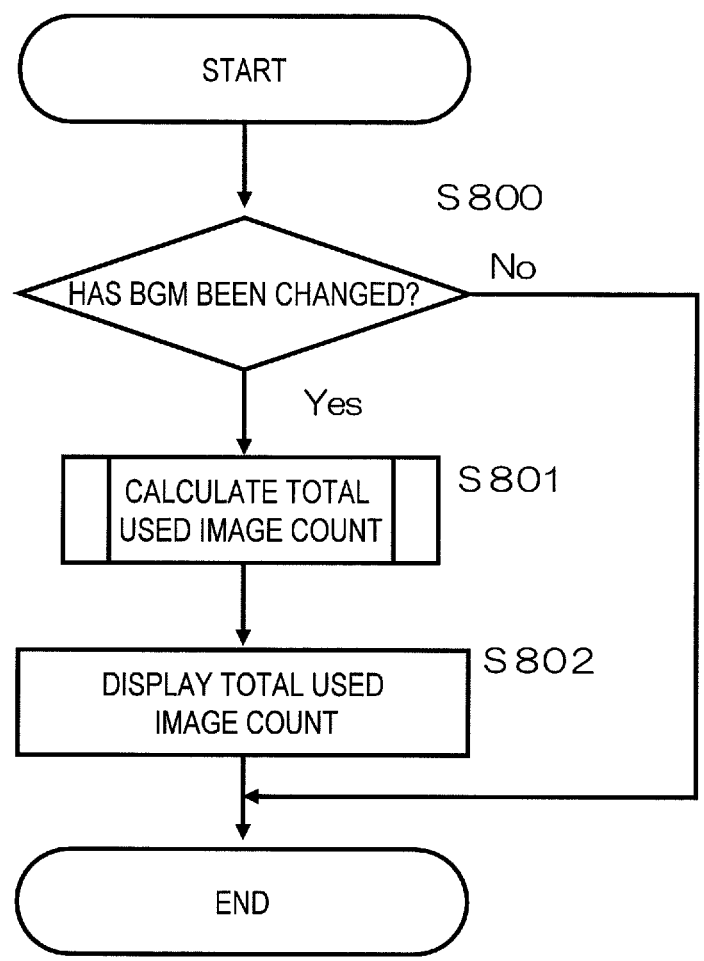
FIG. 8 is a flow chart illustrating details of BGM changing processing according to the first embodiment.

FIG. 8 is a flow chart illustrating details of the BGM changing operation. The CPU 101 checks whether or not the previously set BGM has been changed to another BGM (S800). In the case where the previously set BGM has been changed to another BGM, the CPU 101 recalculates the total used image count (S801). The CPU 101 then updates the display of the total used image count display area 204 of FIG. 2 (S802).

Details of how the total used image count is calculated in Steps S701 and S801 are described next. FIG. 9 is a flow chart illustrating details of a total used image count calculation method.

The CPU 101 updates the story based on the new template or BGM changed from the previously set template or BGM (S900). The CPU 101 updates the story following the story creating procedure described above with reference to the flow chart of FIG. 6. The CPU 101 subsequently resets a counter for the total used image count to 0 (S901).

The CPU 101 detects one by one effect nodes that constitute the story (S902). The CPU 101 next checks the type of the detected effect node and whether or not the display time of an image associated with this effect node satisfies a specific counting condition (S903). The CPU 101 can set various counting conditions in advance. The following four counting conditions are given as an example:

The first counting condition: The CPU 101 can set a condition under which every node constituting the story satisfies the counting condition. The CPU 101 in this case counts every image used in the story when calculating the total used image count.

The second counting condition: The CPU 101 can set a condition under which the counting condition is satisfied when the display time of an image associated with the detected effect node is equal to or longer than a given length of time. For example, the set condition is such that the counting condition is satisfied when the display time of an image associated with the detected effect node is 2 seconds or longer. In this case, an image associated with an effect node that has a display time of 0.5 seconds does not satisfy the counting condition, and therefore is not counted as one of the images used.

The third counting condition: The CPU 101 can set a condition under which the counting condition is satisfied when the count of images (or copies of an image) associated with the detected effect node that are displayed concurrently is equal to or lower than a given count. For example, the set condition is such that the counting condition is satisfied when the count of images (or copies of an image) associated with the detected effect node that are displayed concurrently is equal to or lower than 2. In this case, the counting condition is not satisfied when the count of images (or copies of an image)

associated with the detected effect node that are displayed concurrently is four, and the associated image or images are therefore not counted among the images used.

The fourth counting condition: The CPU 101 can set a condition under which the counting condition is satisfied when the display size of an image associated with the detected effect node is equal to or larger than a given size. For example, the set condition is such that the counting condition is satisfied when the display size of an image associated with the detected effect node is equal to or larger than 80% of the full frame size which is based on the created conte. In this case, an image associated with an effect node whose display size is 30% of the full frame size does not satisfy the counting condition, and therefore is not counted as one of the images used.

Depending on how a story is represented, not every image in the story is clearly visible without being obscured by an effect set to the image. Setting the second to fourth counting conditions or similar conditions therefore suits the user's intent better in some cases. This enables the CPU 101 to display in the total used image count display area 204 the count of only images to which effects that allow a clear view of the images are set.

When it is found in Step S903 that the set condition is satisfied, the CPU 101 increases the total used image count by the count of images used by the effect in question (S904). The CPU 101 does not increase the total used image count when the set condition is not satisfied. The CPU 101 repeats the operations of Steps S902 to S905 until every effect node in the story is detected (S905). When all effect nodes have been detected, the total used image count at the current template and BGM settings is determined (S906).

The CPU 101 finishes the total used image count calculation processing through these operations. As described above, in this embodiment, the count displayed in the total used image count display area 204 may not always be the count of actually used images, but may be the number of times the effect node for which the showy displaying effect is specified is displayed. In other words, an estimated value of the total count of images planned to be used is displayed in the total used image count display area 204. The total used image count calculation processing described above is an example, and does not limit how the image count is counted. The total used image count display area 204 may display the total count of actually used images.

8. Conclusion

As has been described, the PC 100 according to this embodiment includes the CPU 101 which edits a conte sequence which uses a plurality of images by receiving the user's operation for changing the template or play time settings and dynamically controlling the liquid crystal display 109 to display the count of images planned to be used in the editing (the image count corresponding to the set template and the set play time) in conjunction with the change in settings. This makes the PC 100 convenient to users in editing a group of images to be displayed in succession while maintaining a story line.

9. Other Embodiments

Figure 10:
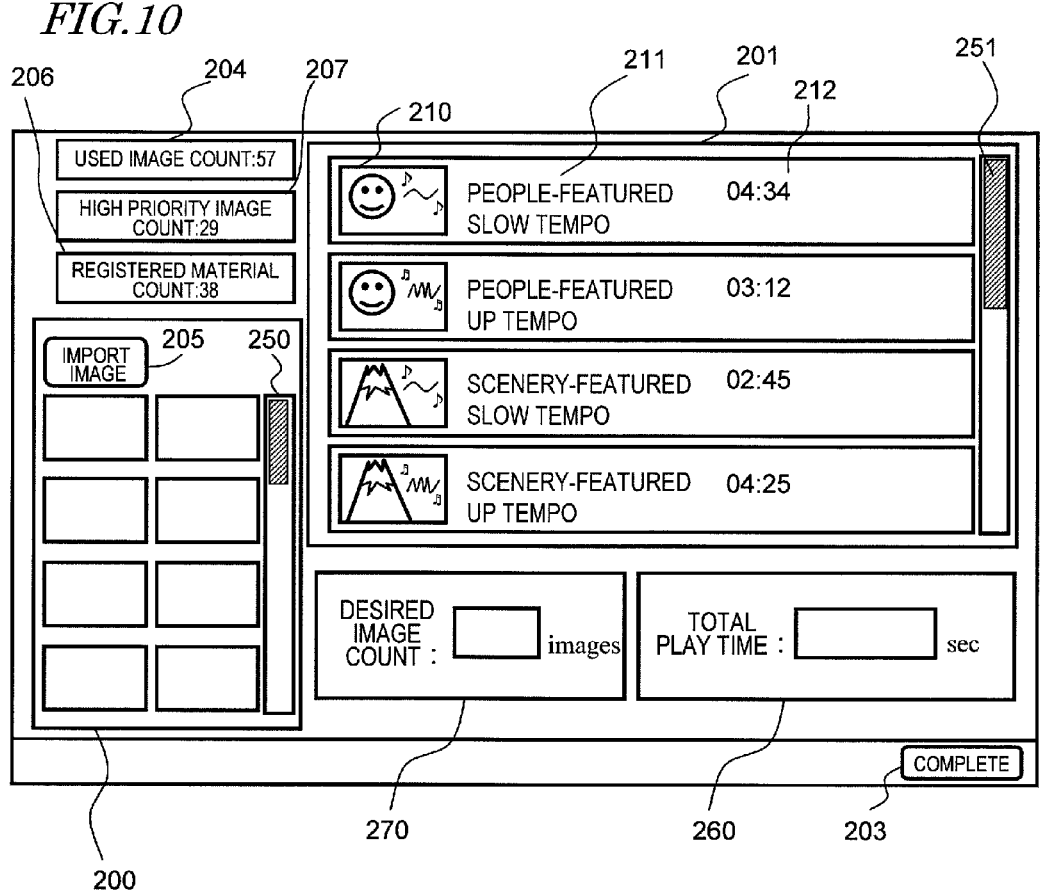
FIG. 10 is a diagram illustrating an example of a selection screen according to another embodiment.

The present invention is not limited to the first embodiment described above, and can be carried out in other modes. Descriptions on other embodiments are all given below. FIG. 10 is a diagram illustrating an example of a selection screen according to one of the other embodiments.

In the first embodiment described above, only the count of images planned to be used is displayed in the total used image count display area 204. The selection screen may further include a registered material count display area 206 to additionally display the count of images currently registered in the material selection area 200 (registered material count). For example, in the case where the total used image count is 57 and the registered material count is 38, the user can determine with ease that the registered material count is lower than the total used image count by referring to the total used image count display area 204 and the registered material count display area 206. The user can therefore more easily determine which of the items of Steps S500 to S502 in FIG. 5 is to be changed. The selection screen may further include a high priority image count display area 207 to additionally display how many of registered images have priority levels equal to or higher than a given value in the case where information indicating a priority level is set to each image registered in the material selection area 200. An image having a priority level equal to or higher than a given value is presumably an image that the user desires to incorporate in the story. The user can accordingly compare the count of images that he/she desires to incorporate in the story and the total used image count by referring to the total used image count display area 204 and the high priority image count display area 207. FIG. 10 illustrates an example in which a high priority image count is 29. This enables the user to more easily determine which of the items of Steps S500 to S502 in FIG. 5 is to be changed.

Figure 9:
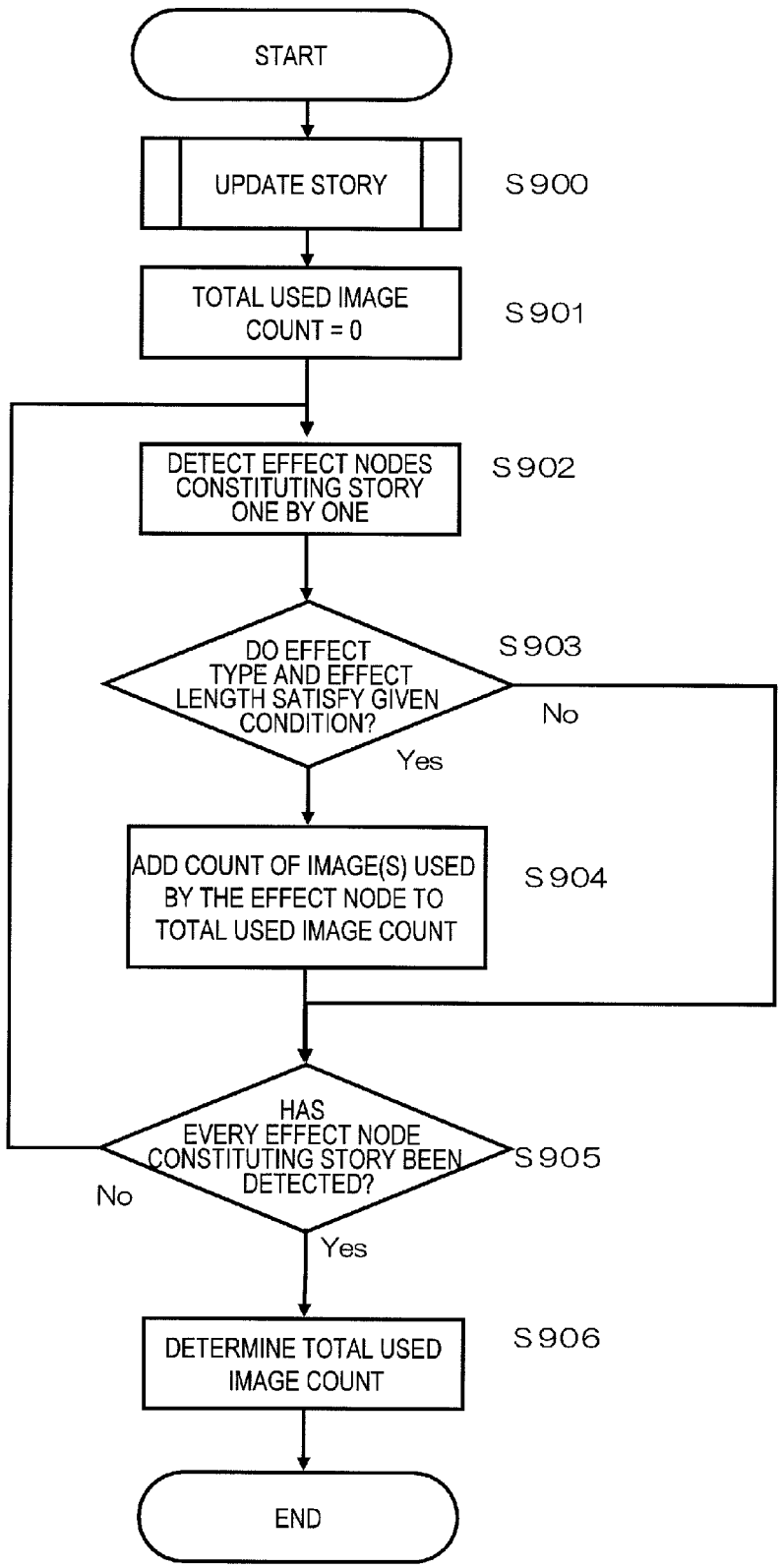
FIG. 9 is a flow chart illustrating details of total used image count calculating processing according to the first embodiment.

The first embodiment described above deals with a case where Steps S900 to S909 of FIG. 9 are executed each time the total used image count is calculated, but the present invention is not limited to such configuration. The CPU 101 may calculate and save in the work memory 103 or other storage devices in advance a total used image count for each combination of play time-template settings by executing Steps S900 to S909. For example, for each of (1) a combination of the "people-featured slow-tempo" template and a play time 5 seconds longer than the current play time, (2) a combination of the "people-featured up-tempo" template and a play time 5 seconds longer than the current play time, (3) a combination of the "scenery-featured slow-tempo" template and a play time 5 seconds longer than the current play time, and (4) a combination of the "scenery-featured up-tempo" template and a play time 5 seconds longer than the current play time, a total used image count may be calculated in advance to save results of the calculation. The CPU 101 in this case may obtain the total used image count in Steps S701 and S801 by referring to the value saved in advance. This way, when the current template or BGM is changed to another template or BGM, the total used image count is obtained in a shorter time and the user interface (UI) screen responds quickly. In the case where a default BGM is prepared in a template, in particular, calculating in advance the total count of images used when the default BGM is employed is advisable.

As illustrated in FIG. 10, the selection screen may further include a desired image count display area 270 to allow the user to specify the count of images to be incorporated in the story. When a desired image count is specified in the desired image count display area 270, the CPU 101 calculates the total used image count based on the currently set template and play time. The CPU 101 then determines how the currently set template and play time are to be changed in order to make the total used image count closer to the image count specified by the user. For example, in the case where a slow-tempo template is set at present and the image count specified by the user is higher than the total used image count, information suggesting a change to an up-tempo template (suggestion information) may displayed on the liquid crystal display 109. Alternatively, information suggesting a change to a longer play time may be displayed on the liquid crystal display 109 when the image count specified by the user is higher than the total used image count. The CPU 101 may instead determine how much longer or shorter the currently set play time needs to be in order to reach the image count specified by the user, based on a table saved in advance that defines for each combination of play time-template settings the relation with a total used image count, to display the determined play time on the liquid crystal display 109. The user can thus easily determine how editing conditions are to be changed in order to reach the count of images that the user wants to incorporate in the story.

As illustrated in FIG. 10, a total play time setting area 260 may be provided instead of the BGM selection area 202. This way, the user can directly set the total play time of a movie. The image editing device in this case may be designed so that a default BGM of the selected template is employed or may be designed so that a BGM can be set separately on another screen. In this example, a total play time 260 set directly by the user maintains the same length after a change to another BGM. The CPU 101 calculates the total image count and creates a movie based on the combination of the set total play time and the set template.

In the case where too many images are registered to be displayed at once in an image selection area 205, a scroll bar 250 may be provided so that the rest of the images are displayed by scrolling. Similarly, in the case where too many types of templates are prepared to be displayed at once in the template selection area 201, a scroll bar 251 may be provided so that the rest of the templates are displayed by scrolling. Instead of the scroll bars 250 and 251, a switch button may be provided so that the rest of the images and the like may be displayed.

The embodiment described above discusses an example in which the material selection area 200, the template selection area 201, the BGM selection area 202, and the total used image count display area 204 are displayed in one screen (window), but the present invention is not limited to this example, and these areas may be displayed in separate windows instead of the same screen. However, considering users' conveniences, it is preferred to display these areas in a manner that ensures the areas do not overlap each other and thus allows the user to view all of the areas at a glance. Even when these areas are displayed in the same window, any screen design other than the screen design illustrated in FIG. 2 or 10 can be employed.

The function of the image editing device, which is the PC 100 in the first embodiment, can be implemented by executing a program that defines the processing procedures described above on an any electronic device that has a processor. This program can be recorded on an arbitrary recording medium such as a CD-ROM or a DVD-ROM, or distributed via a telecommunication line. For example, if the program is executed on a server set up at a data center or the like, the service can be also provided in the form of so-called cloud computing to a user located in a place remote from the data center. Another possible mode is to configure a video camera so as to execute the processing procedures described above and connect the video camera to a television set, which serves as a display.

The first embodiment lets the user select a desired template from among a plurality of prepared templates to set displaying effects of respective images, but the present invention is not limited to this mode. For example, the image editing device may set a displaying effect that discriminates the high volume/low volume or high tone/low tone of the sound of the set BGM to display images at a tempo and dramatization suited to the swell of the tune. Furthermore, in the case where the image displayed is a moving image, the audio of the moving image itself may be used instead of a BGM.

The present invention is applicable to any electronic device capable of image editing operations such as personal computers, cellular phones, and video cameras. The function of the present invention can also be implemented in the form of a program recorded and distributed on a CD, a DVD, or other recording media.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2011-031593 filed on Feb. 17, 2011 and No. 2012-012336 filed on Jan. 24, 2012, the entire contents of which are hereby incorporated by reference.

What is claimed is:

1. An image editing device that creates a sequence of images from a plurality of images, comprising:
    an input interface that receives a user's selection of (i) a plurality of candidate images from the plurality of images, and at least one of (ii) a total play time of the sequence of images and (iii) displaying effects of the sequence of images; and
    a controller that:
    calculates how many images are planned to be used in the sequence of images based on the selected total play time and/or the selected displaying effects;
    controls a display device to display a result of the calculation of how many images are planned to be used in the sequence of images before the user's selection is fixed and the sequence of images is created; and
    after the user's selection is fixed, creates the sequence of images based on the user selected total play time and/or the user selected displaying effects and the user's selection of candidate images.

2. An image editing device according to claim 1, wherein the controller controls the display device to display an image of a first setting area in which the plurality of candidate images are set, an image of a second setting area in which the total play time of the sequence of images is set, and an image of a third setting area in which the displaying effects of the sequence of images are set.

3. An image editing device according to claim 2, wherein the controller controls the display device to display the result of the calculation along with the image of the second setting area and the image of the third setting area.

4. An image editing device according to claim 1, wherein the total play time of the sequence of images is determined by specifying a background music to be played along with the sequence of images.

5. An image editing device according to claim 1, wherein the displaying effects are determined by selecting from a plurality of types of template information prepared.

6. An image editing device according to claim 5, wherein the plurality of types of template information are information that defines for each image a switching effect and a play time.

7. An image editing device according to claim 2, wherein the controller controls the display device to display the first setting area, the second setting area, the third setting area, and the result of the calculation in the same screen.

8. An image editing device according to claim 2, wherein the controller controls the display device to further display a fourth setting area, which is for allowing the user to set a desired count of images to be used in the sequence of images, along with the first setting area, the second setting area, and the third setting area, and to display suggestion information for matching the total count of images planned to be used in the sequence of images with the set desired count of images.

9. An image editing method for creating a sequence of images from a plurality of images, comprising:
a step A of receiving a user's selection of (i) a plurality of candidate images from the plurality of images, and at least one of (ii) a total play time of the sequence of images and (iii) displaying effects of the sequence of images;
a step B of calculating how many images are planned to be used in the sequence of images based on the selected total play time and/or the selected displaying effects;
a step C of controlling a display device to display a result of the calculation of how many images are planned to be used in the sequence of images before the user's selection is fixed and the sequence of images is created; and
a step D of creating, after the user's selection is fixed, the sequence of images based on the user selected total play time and/or the user selected displaying effects and the user's selection of candidate images.

10. An image editing method according to claim 9, wherein the step C comprises the step of controlling the display device to display an image of a first setting area in which the plurality of candidate images are set, an image of a second setting area in which the total play time of the sequence of images is set, and an image of a third setting area in which the displaying effects of the sequence of images are set.

11. An image editing method according to claim 10, wherein the step B comprises the step of controlling the display device to display the result of the calculation along with the image of the second setting area and the image of the third setting area.

12. A computer program, stored on a non-transitory computer-readable medium, to be executed by a computer mounted in an image editing device for creating a sequence of images from a plurality of images, the program causes the computer to execute the steps of:
receiving a user's selection of (i) a plurality of candidate images from the plurality of images, and at least one of (ii) a total play time of the sequence of images and (iii) displaying effects of the sequence of images;
calculating how many images are planned to be used in the sequence of images based on the selected total play time and/or the selected displaying effects;
controlling a display device to display a result of the calculation of how many images are planned to be used in the sequence of images before the user's selection s fixed and the sequence of images is created; and
after the user's selection is fixed, creating the sequence of images based on the user selected total play time and/or the user selected displaying effects and the user's selection of candidate.

13. An image editing program according to claim 12, wherein the step of outputting comprises the step of controlling the display device to display an image of a first setting area in which the plurality of candidate images are set, an image of a second setting area in which the total play time of the sequence of images is set, and an image of a third setting area in which the displaying effects of the sequence of images are set.

14. An image editing method according to claim 13, wherein the step of determining comprises the step of controlling the display device to display the result of the calculation along with the image of the second setting area and the image of the third setting area.

15. An image editing device according to claim 1, wherein the controller calculates how many images are planned to be used in the sequence of images from the plurality of candidate images when the total play time and the displaying effects are set, and/or when at least one of the total play time and the displaying effects is changed.

16. An image editing method according to claim 9, comprising:
calculating how many images are planned to be used in the sequence of images when the total play time and the displaying effects are set, and/or when at least one of the total play time and the displaying effects is changed.

17. An image editing program according to claim 12, the program causing the computer to execute the steps of:
calculating how many images are planned to be used in the sequence of images when the total play time and the displaying effects are set, and/or when at least one of the total play time and the displaying effects is changed.

* * * * *